(12) United States Patent
Orsolini et al.

(10) Patent No.: US 8,082,509 B2
(45) Date of Patent: Dec. 20, 2011

(54) SYSTEMS AND METHODS FOR PROVIDING IMMEDIATE ACCESS TO VIRTUAL COLLABORATION FACILITIES

(75) Inventors: Garry S. Orsolini, Fair Oaks, CA (US); Adrian Robert Pell, Auburn, CA (US); Kevin Hutler, Foresthill, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1750 days.

(21) Appl. No.: 11/112,136

(22) Filed: Apr. 22, 2005

(65) Prior Publication Data

US 2006/0242632 A1 Oct. 26, 2006

(51) Int. Cl.
*G06F 3/00* (2006.01)
(52) U.S. Cl. ........ 715/751; 715/753; 715/757; 709/225; 705/50
(58) Field of Classification Search .................. 717/140; 715/751, 753, 757; 705/50; 709/225
See application file for complete search history.

(56) References Cited

U.S. PATENT DOCUMENTS

| | | | |
|---|---|---|---|
| 5,819,243 A * | 10/1998 | Rich et al. | 706/11 |
| 6,629,129 B1 * | 9/2003 | Bookspan et al. | 709/204 |
| 6,728,756 B1 * | 4/2004 | Ohkado | 709/205 |
| 6,988,138 B1 * | 1/2006 | Alcorn et al. | 709/225 |
| 7,072,940 B1 * | 7/2006 | Day et al. | 709/204 |
| 2002/0062403 A1 * | 5/2002 | Burnett et al. | 709/318 |
| 2002/0076025 A1 * | 6/2002 | Liversidge et al. | 379/202.01 |
| 2006/0080432 A1 * | 4/2006 | Spataro et al. | 709/224 |
| 2006/0095376 A1 * | 5/2006 | Mitchell et al. | 705/50 |

OTHER PUBLICATIONS

Alan Simpson, Windows 95 Uncut, 1995, IDG Books Worlwide, Inc., p. 470.*

* cited by examiner

*Primary Examiner* — Chat Do
*Assistant Examiner* — Phenuel Salomon

(57) ABSTRACT

A computer-implemented method includes generating a list of virtual collaboration facilities associated with an authenticated user, and detecting selection of one of the virtual collaboration facilities on the list. An authenticated user can request a key to be issued to allow an unauthenticated user to gain access to the selected virtual collaboration facility.

22 Claims, 4 Drawing Sheets

SYSTEMS AND METHODS FOR PROVIDING IMMEDIATE ACCESS TO VIRTUAL COLLABORATION FACILITIES

BACKGROUND

Virtual collaboration software tools have become widely used and are often considered critical 'must have' capabilities. Virtual collaboration and conferencing tools enable users to present and share slides, application programs, files, desktop displays, and other information to a group of people in real-time using a web browser or networked application. While virtual collaboration tools allow users in many different locations to schedule and attend meetings quickly and easily, it is necessary to balance competing demands between security and convenience, or ease of use. Often, the first ten or more minutes of meeting time may be lost while participants connect to the correct virtual room or event. Adding new participants once the meeting is underway is typically time-consuming and difficult. Attending scheduled virtual events easily when scattered over weeks and months can also be problematic.

Most virtual meeting applications use an event key that is generally composed of a sequence of letters and/or numbers. Each event key is unique and grants access to a specific virtual room or event. To attend a meeting or event, a participant typically opens a web browser, navigates to a web site, and provides a login name and the event key; or invokes a Universal Resource Locator (URL) that embeds all the information required to transport the user to the virtual event. Some applications use Internet Protocol (IP) addresses to allow participants to connect to each others' workstations. Other virtual meeting application programs allow an access control list (ACL) to be generated. Once created, an ACL can be referenced to determine whether particular users are allowed access to an event.

Each of the above applications has limitations and deficiencies. When using a 'key', the key must be generated and communicated to all participants. Typically the key is generated randomly and is purposely made difficult to memorize for security reasons. As a result, the key is difficult to communicate verbally. The use of IP addresses requires that the participant discover the IP address of their workstation, which can be a cumbersome process. This is because Dynamic Host Configuration Protocol (DHCP) has become widely used to automatically assign IP addresses, in which case, fixed IP addresses are no longer available. Each new session requires the user to determine the IP address assigned to a particular workstation for the session. Some applications provide a directory service that equates IP addresses to user names, but the directory service can be slow and cumbersome to use. ACLs can be inconvenient due to the need to create and maintain a current participant list as well as to authenticate the participants.

SUMMARY

In some embodiments, a computer-implemented method includes generating a list of virtual collaboration facilities associated with an authenticated user, and detecting selection of one of the virtual collaboration facilities on the list. An authenticated user can request a key to be issued to allow an unauthenticated user to gain access to the selected virtual collaboration facility.

BRIEF DESCRIPTION OF THE FIGURES

Embodiments disclosed herein may be better understood by referencing the accompanying drawings. The use of the same reference symbols in different drawings indicates similar or identical items.

DETAILED DESCRIPTION

Embodiments of systems and techniques disclosed herein can be used to provide a user interface with a tray application that enables convenient and immediate access to virtual rooms and events, while preserving strong security.

Figure 1:
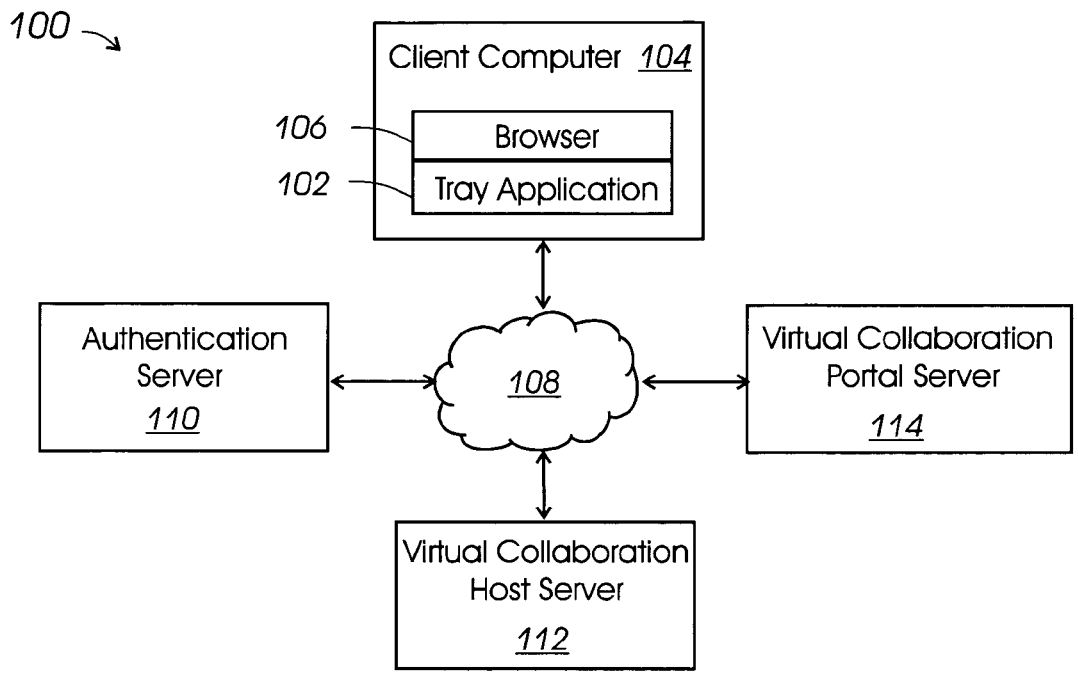
FIG. 1 is a diagram of an embodiment of a system in which features for immediately connecting to a virtual meeting can be implemented.

Referring to FIG. 1, an embodiment of a processing system 100 in which tray application 102 that enables users to quickly attend meetings and events over a network (i.e., virtually) can be implemented is shown. Tray application 102 can be installed on client computer 104 and configured to communicate with browser program 106, such as through an application program interface (API) or other suitable technique. Client computer 104 can interface with network 108 to communicate with one or more server computers, such as authentication server 110, virtual collaboration host server 112, and virtual collaboration portal server 114, as well as other client computers 104.

Authentication server 110 includes or can access facilities such as an enterprise site wide directory, a lightweight directory access protocol (LDAP) service, or other suitable facility to determine whether a particular user should be granted access to the portal server 114. If a user is logging into the virtual collaboration facilities for the first time, authentication server 110 can require the user to provide a valid login name and other registration information, such as a password, and/or contact information. Additionally, authentication server 110, an administrator, or other user with appropriate access can register a user and provide a password or other authentication information such as a key that allows the user to login to the virtual collaboration facilities.

As used herein, the terms "virtual collaboration facilities" and "virtual facilities" refer to one or more virtual rooms, meetings, events, and/or other collaboration locations or activities that are accessible via a computer network.

Virtual collaboration portal server 114 can be configured to provide a centralized facility to perform and/or access virtual collaboration-related functions. For example, when a user logs in, portal server 114 can provide a list of rooms that the user is registered or allowed to visit based on a key or other identifying information. Portal server 114 can also manage a list of rooms/events for each user, updating the corresponding list each time a room or event is added or deleted by a user, an authorized administrator, or other suitable means, such as an automated program. In some embodiments, portal server 114 can provide an interface to shared virtual rooms and events for tray application 102 across heterogeneous computer/network platforms. As a result, portal server 114 enables static and live displays of meetings and events to be shared with many other users over network 108.

In some embodiments, portal server 114 communicates with virtual collaboration host server 112 to provide information regarding a selected virtual room to browser 106. For example, when a user selects a particular virtual room from a list, portal server 114 can issue a request for a Uniform Resource Locator (URL) corresponding to the selected room. Host server 112 can respond to portal server 114 with the URL that includes information for the room selected by the user. Browser 106 receives and uses the URL from portal server 114 to access and present the information for the selected room to the user.

Embodiments of system 100 may be practiced in distributed computing environments as shown in FIG. 1, where tasks are performed by remote processing devices that are linked through communications network 108. In a distributed computing environment, program modules may be located in both local and remote memory storage devices. Additionally, some embodiments may be implemented as logic instructions and distributed on computer readable media or via electronic signals. Components in system 100, such as client computer 104 and servers 110, 112, 114, can be implemented in one or more suitable data processing devices, such as network servers, personal computers, hand-held devices, multi-processor systems, microprocessor-based or programmable consumer electronics, network PCs, network adapters, minicomputers, mainframe computers and the like.

System 100 can also include memory and storage devices (not shown) for bi-directional communication with client computer 104 and servers 110, 112, 114. One or more input/output devices (not shown) such as display monitors, track balls, mice, keyboards, speakers, microphones, scanners, printers, touch-sensitive displays, card readers, magnetic or paper tape readers, tablets, styluses, voice or handwriting recognition systems, and/or other suitable types of devices can be configured to operate with client computer 104 and/or servers 110, 112, 114. Network 108 can be a local area network and/or a wide area network such as the Internet that transmits information between client computer(s) 104 and servers 110, 112, 114. Such information, which can be represented as a sequence of instructions to be executed by client computer 104 and servers 110, 112, 114, may be received from and output to network 108, for example, in the form of a computer data signal embodied in a carrier wave.

Figure 2:
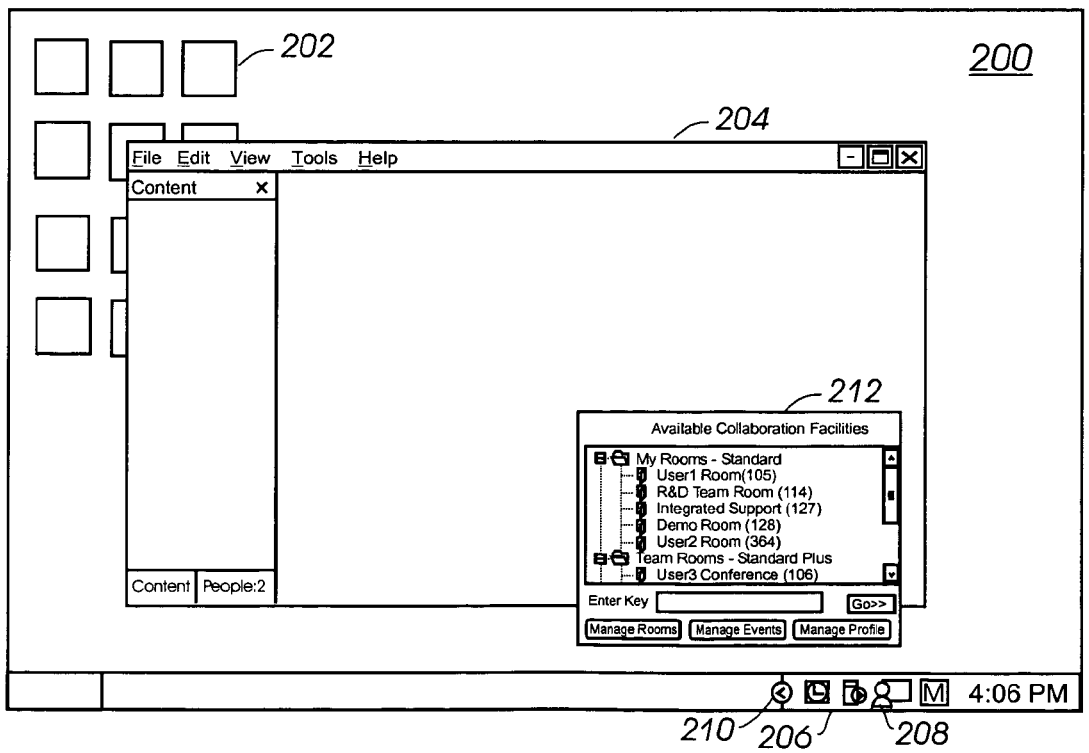
FIG. 2 is a diagram of an embodiment of a computer user desktop environment including an interface for immediately connecting to a virtual meeting.

Referring now to FIGS. 1 and 2, FIG. 2 shows an embodiment of a desktop display 200 that can be presented to a user of client computer 104. Client computer 104 typically uses an operating system, such as the WINDOWS® operating system from Microsoft Corporation in Redmond, Wash., for example, that can generate desktop display 200. A user can typically select options, shown as icons 202, to invoke corresponding application programs and browser 106 from desktop display 200. Application programs and browser 106 often provide a user display or interface that is presented in a corresponding "window" 204. For example, window 204 shows an embodiment of an interface to virtual rooms and events.

Since two or more windows 204 can be open concurrently, the user must often re-size, move, minimize, or exit one or more windows 204 to access the desired icon 202. To avoid disrupting the user's window layout, desktop display 200 can include tray 206 outside the area where windows 204 may be positioned that allows a user to select from among a group of icons representing particular application programs. For example, icon 208 can be used to represent virtual collaboration tray application 102. Icons in tray 206 may be displayed at all times or, alternatively, only when the user selects an option, such as button 210, to reveal the icons available in tray 206.

In some embodiments, a user can attend a virtual meeting or event by opening an instance of browser 106, and navigating to the virtual collaboration facilities by entering a network address for the room or event, such as a URL, in a data entry field (not shown). To access virtual collaboration facilities, a user may be required to supply a username and a security token, such as a password or a key. Upon successful login, tray application 102 can be supplied to client computer 104 by portal server 114. Virtual collaboration icon 208 can be displayed once tray application 102 is running.

When a user selects virtual collaboration icon 208, virtual room pop up window 212 can be displayed. Pop up window 212 can display some or all virtual collaboration facilities that the user has created or has been invited to visit. The user can enter any virtual collaboration facilities shown in pop up window 212 immediately by selecting the desired room, event, meeting, or other item, for example, with a single mouse click. Any of the virtual collaboration facilities shown in pop-up window 212 can be selected one or more times during a browser session. The user can enter/paste a key required to enter a particular facility into key entry field 308 in pop-up window 212, as required.

When a room in window 212 is selected, window 212 is typically removed from desktop display 200, and information associated with the selected virtual facility is displayed in window 204. Such information can include, for example, a list of other users currently in the room, a list of content available for viewing, and a workspace area where content being discussed can be posted. Window 204 can also include selectable options and/or a menu bar to enable users to access features such as live chat, instant messaging, e-mail, video camera displays, content editing and highlighting tools, file import/export, and other capabilities suitable for online collaboration between users.

Figure 3:
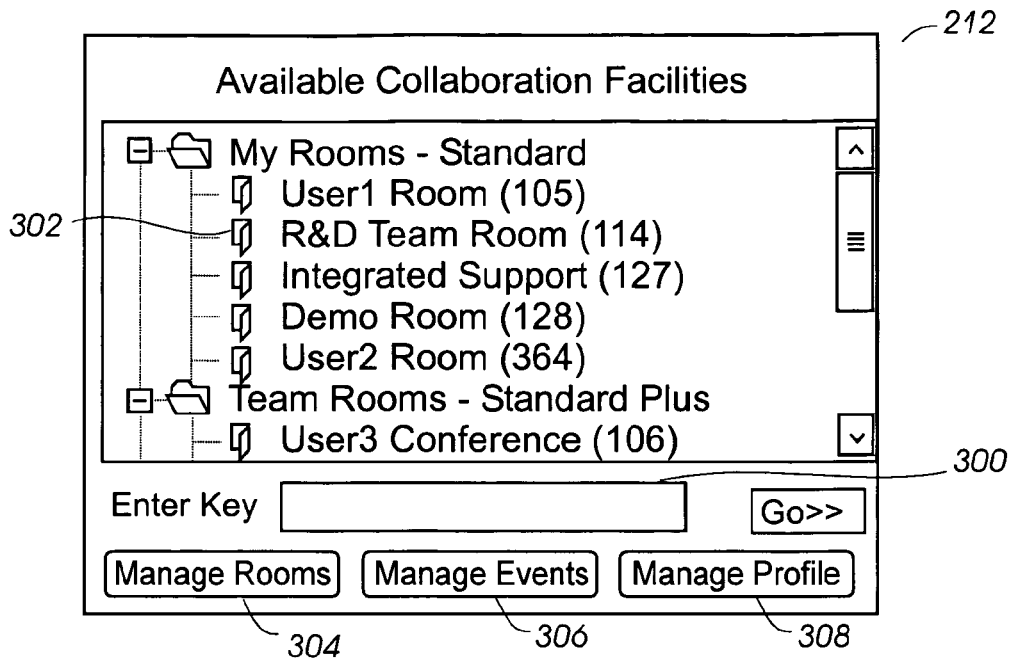
FIG. 3 is a diagram showing further detail of the user interface for immediately connecting to a virtual meeting of FIG. 2.

Referring to FIGS. 1 and 3, FIG. 3 shows a larger view of pop-up window 212 from FIG. 2 that includes folders of one or more rooms created by the user (My Rooms), and project rooms (Team Rooms) created by the same or a different user. Users may have access to more than one logical group of virtual rooms, events and other facilities. Different logical groups can be used to permit use of different types of resources or other suitable purpose. For example, a "Standard" grouping might include only basic features, where a "Standard Plus" grouping might include additional features such as voice or video communication. The user may have both My Rooms and Team Rooms in each type of grouping. Other room categories can be used in addition to, or instead of, My Rooms, Team Rooms, Standard, and Standard Plus categories.

The owner or creator of Team Rooms can designate users as part of a group, such as a team or project, for example. A corresponding Team Room can be automatically added to the room lists of its members. Additionally, a message, such as an e-mail message or instant messenger message, can be sent automatically or under control of the owner to inform the users they have been added to a room, and to provide them with a key to enter the room. As a result, members can easily gain access to a designated room, quickly and securely. The user can enter/paste a key required to enter a particular room into key entry field 300 in pop-up window 212, as needed.

Indicators, such as door symbols 302, can be used to indicate availability of rooms on the list. For example, open door symbols can be used to indicate that the room is available to schedule events or invite others to join the room. In some embodiments, a list of meetings, events, and/or other activities that are scheduled for a selected room can be displayed. For example, the list of events can be displayed in a separate pop-up window, or presented in an indented list under the selected room. Other suitable features for indicating availability of rooms and presenting lists of activities can be used.

Figure 4:
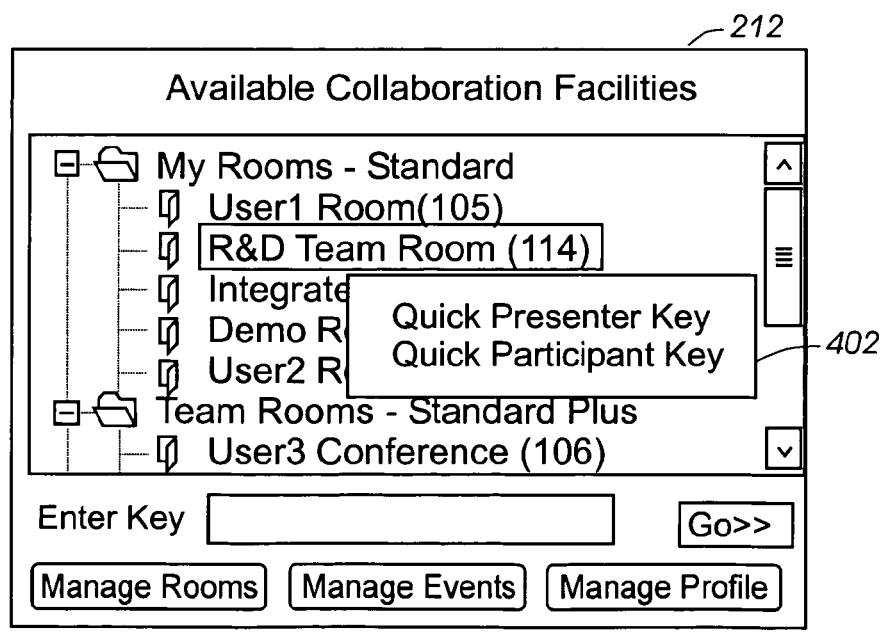
FIG. 4 is a diagram showing an embodiment of a quick key feature for the user interface of FIG. 2.

Referring to FIG. 4, if a user is not authenticated and wants to attend an event or meeting, an authorized user can access a 'quick key' feature to have portal server 114 or other suitable component of system 100 generate a security token, such as a key, to allow the unauthenticated user to join the meeting or event immediately. In some embodiments, the quick key feature is activated by selecting a particular room in pop-up window 212 and performing an action, such as a right button click on a mouse, to indicate that a quick key should be generated for the selected room.

In other embodiments, a control feature can be included in pop-up window 212 or as part of another user interface to allow the user to request a quick key without selecting a particular room. Such a control feature can also be used if there is only one room available to the user. Alternatively, or the user could associate the key with a selected virtual facility at a later time. Similarly, the same or a different control feature can be used to generate a quick key for a virtual facility that does not exist yet, but which can be created as a result of creating the key. Further, a temporary virtual facility can be created when the quick key is generated that may or may not be deleted automatically after use.

When the quick key feature is activated, tray application 102 can present quick key pop-up window 402 that allows the user to select a type of key desired. The type of key selected can be used to enable or disable various capabilities available to users of a room. For example, in some embodiments, a user can be given access to a room as a presenter or a participant. Presenters will typically be allowed to use more features than presenters, such as posting and removing content in window 204, whereas participants may only have read access. Other categories of quick key types and associated capabilities can be used in addition to, or instead of, presenter and participant categories. In other embodiments, keys may be uncategorized, with each key being the same type.

Figure 5:
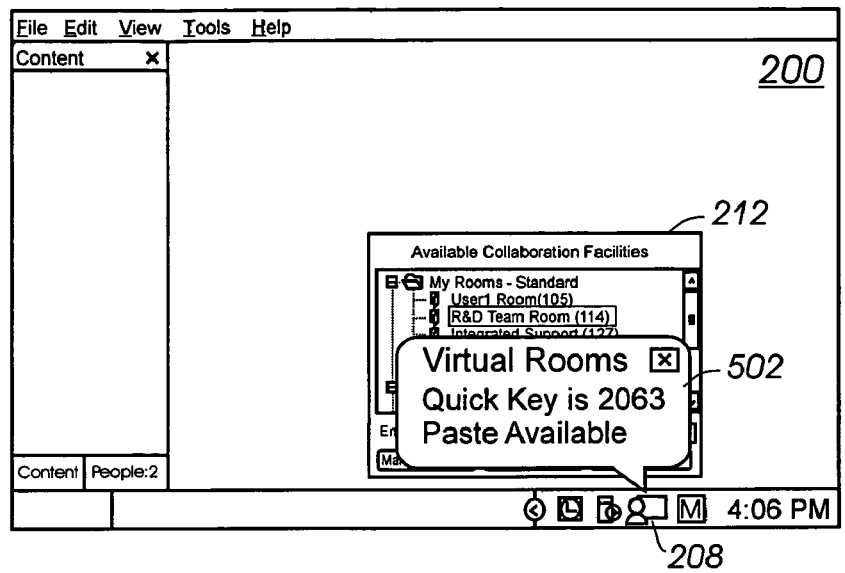
FIG. 5 is a diagram showing further detail of the quick key feature for the user interface of FIG. 4.

Referring to FIG. 5, when a type of key is selected or is not required, tray application 102 can present a suitable security token in pop-up window 502 or other suitable location. The security token can be generated by authentication server 110 or other component in system 100 or other suitable location. The security token can be any suitable type of parameter, such as a numeric value, that can be provided to the unauthenticated user. In some embodiments, an interface can be provided that allows a system administrator to configure attributes of the quick key, such as the length and complexity of the key, and an expiration time/date after which the key is no longer valid. For example, the quick key may be short numerical sequence that is easy for the authenticated user to communicate verbally, in writing, or otherwise, to the unauthenticated user, but set to expire within a few minutes of issuance.

The quick key can automatically be included in a formatted network address string, such as a URL, and copied into a 'clipboard' associated with desktop display 200. The clipboard contents including both the network address of the room and the key are available to 'paste' as a hyperlink in an e-mail message, instant messenger, or other suitable communication, to the unauthenticated user. Pop-up window 502 can provide a message indicating the value of the quick key, and that the key and/or address of the corresponding virtual room can be pasted from the clipboard. The quick key can also be provided to authentication server 110 so that the user can be authenticated when trying to access the room. If the user receives the message electronically, the user can typically select the link to open a new browser window at the network address specified in the link. The key can also be entered automatically when the link is selected, thereby eliminating the need for the user to enter any information to join the virtual room or event.

Referring again to FIG. 2, pop-up window 212 for tray application 102 can also include other features, such as selectable options 304, 306, 308 that allow a user to manage rooms, events, and profiles. The embodiment of pop-up window 212 shown includes manage rooms option 304 that enables a user to quickly and securely access portal server(s) 114 to manage rooms. For example, an appropriately authorized user can be allowed to create, delete, and/or maintain virtual rooms, as well as lists of members for team rooms.

A user can select manage events option 306 to create/delete/modify events, notify others of events, and set reminders for events that the user wishes to be prompted to attend. An event organizer can designate rooms and events as 'private' or 'public', select or create a category for the room/event, and provide a short description of the content of the room/event. Tray application 102 communicates with portal server(s) 114 to track events and can generate a pop up window (not shown) that includes a descriptive reminder and a selectable Join Event option when it is time to prompt the user to attend.

Manage profile option 308 can be included in pop-up window 212 to allow users to enter relevant profile information and register interest in various topics. As virtual events are conducted that meet the users interest criterion, a pop up window (not shown) can be displayed with a descriptive overview and a 'Join Event' option. A user can also indicate whether an advance reminder should be issued before events so the user can arrange their schedule, as well as be reminded, to attend the events.

The list of rooms in window 212 can also include room numbers or other suitable room identifiers, in addition to, or instead of the names of the rooms, thereby allowing the user to identify rooms by name, number, or other suitable identifier.

Figure 6:
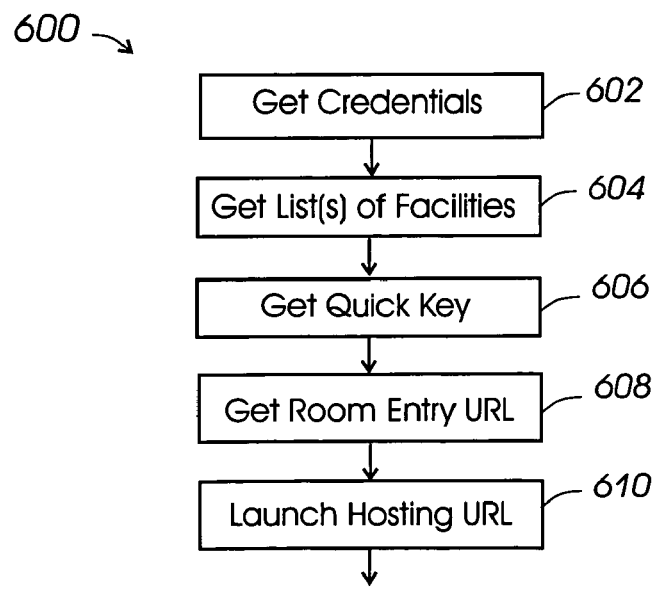
FIG. 6 is a flow diagram of an embodiment of processes that can be performed to allow users to immediately connect to virtual collaboration facilities.

Referring to FIGS. 1 and 6, FIG. 6 shows an embodiment of process 600 that can be performed by tray application 102 once a user has logged in to the virtual collaboration facilities and selects virtual collaboration icon 208 (FIG. 2). Process 602 can include issuing a request to authentication server 110 to supply credentials required to get a list of rooms associated with the particular user from portal server 114. In some embodiments, the credentials supplied by authentication server 110 are in the form of an authenticated, time-stamped token containing the proposed user id, in a form that portal server 114 can validate as coming from a particular authentication server 110.

In process 604, tray application 102 requests a list of rooms from portal server 114. In some embodiments, tray application 102 includes the credentials supplied by authentication server 110 in the request for the room list to portal server 114. Portal server 114 can use the credentials to help identify and determine whether the user is authorized to access the information requested. Tray application 102 presents the list of rooms to the user in window 212 (FIG. 2) or other suitable location once the list is received from portal server 114.

Process 606 can be performed when a user invokes the quick key feature, as further described herein with reference to FIGS. 4 and 5. In process 606, tray application 102 detects input from the user to activate the quick key feature, and sends a request for a quick key for the selected room to portal server 114. Once tray application 102 receives the quick key from portal server 114, tray application 102 presents the quick key to the user. The user can then provide the quick key to the non-authenticated user, who uses the key to join the room specified in the quick key request.

When a user selects a room from the list in pop-up window 212 (FIG. 2), process 608 can include issuing a request for the network address/identifier, such as a URL, of the selected room. Portal server 114 receives the request, and can forward the request to virtual collaboration host server 112. Host server 112 can respond to portal server 114 with the URL or other identifying information for the selected virtual room. Tray application 102 receives the identifying information from portal server 114 in process 610 and forwards the information to browser 106.

Figure 7:
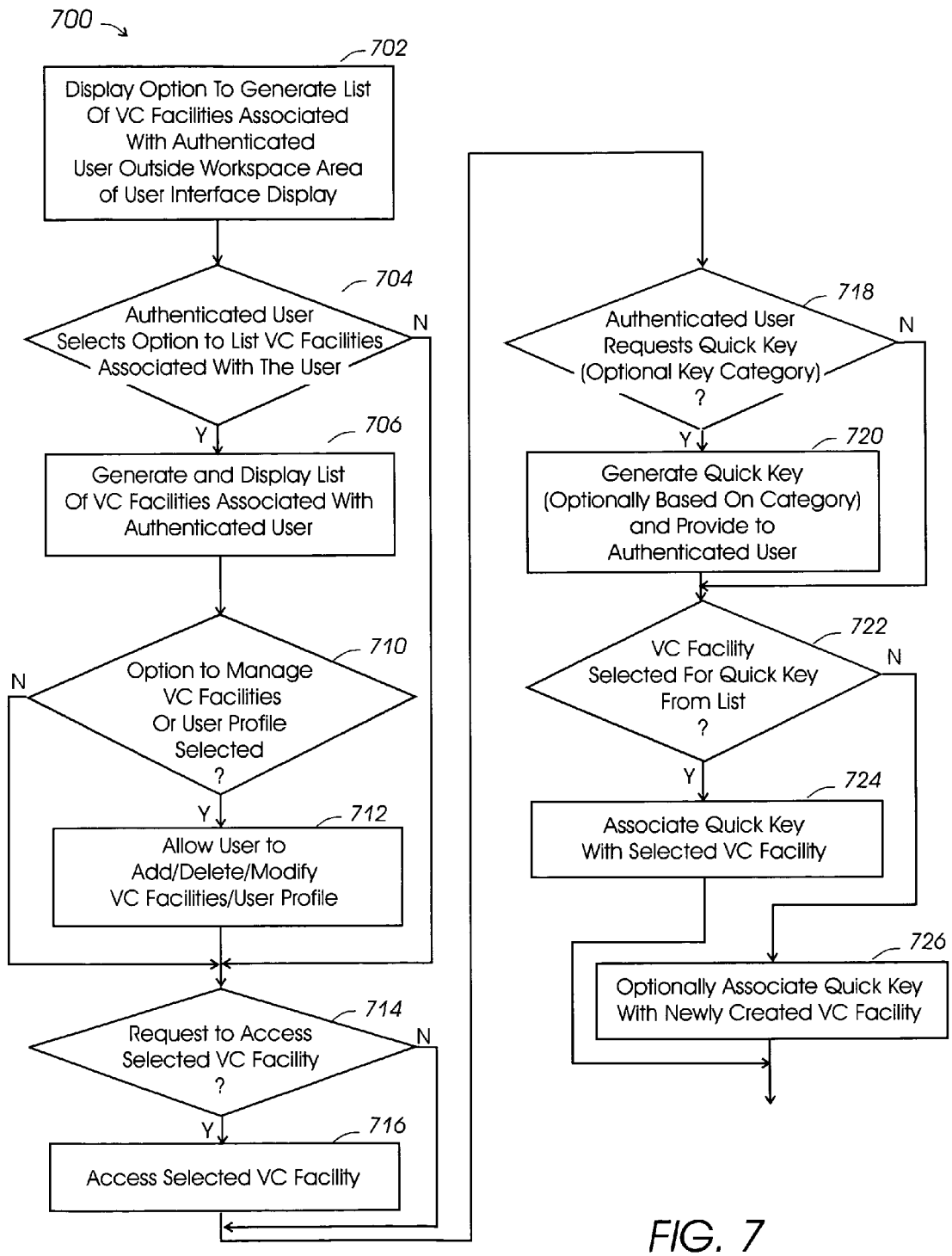
FIG. 7 is a flow diagram of another embodiment of processes that can be performed to allow users to immediately connect to virtual collaboration facilities.

Referring to FIG. 7, a diagram of an embodiment of process 700 is shown that can be performed to allow a user to display and interact with a list of virtual collaboration (VC) facilities and/or generate a quick key to allow a non-authenticated user access one or more VC facilities. In process 702, an option to generate a list of VC facilities associated with an authenticated user is presented. Generally, the option is displayed outside the workspace area of a user interface display so that the user does not have to rearrange windows or other items in his workspace to access the option. The user can access the option after logging in to use the VC facilities or otherwise authenticating themselves.

Process 704 determines whether the option to display the list of VC facilities has been selected. If so, process 706 generates and presents a list of VC facilities associated with the requesting user. The list is typically presented on the user's interface display, but other techniques, such as an audio list, can be used to present the list.

While the list is presented, process 710 can include determining whether the user has selected any options to manage the VC facilities, or the user's profile, which can be presented with the list of VC facilities. If so, process 712 can include presenting another interface that allows the user to add, delete, modify selected VC facilities and/or the user's profile.

If the user requests access to a selected VC facility in process 714, process 716 can include retrieving information regarding the selected VC facility and presenting the information to the user, for example, in window 204 (FIG. 2).

Process 718 can include detecting input from the user as a request for a quick key. The quick key can be used to allow an unauthenticated user to access one or more of the VC facilities, and, in some embodiments, can be requested whether or not a list of VC facilities is being displayed. When a request to generate a quick key is received, process 718 can include determining whether the user wants to create a particular type or category of quick key. The different types of quick keys can be used to determine whether various capabilities for the VC facility are available to a user who uses the quick key to access the VC facility.

When a quick key request is detected, process 720 can include generating the quick key, and providing the quick key to the requesting user. The complexity of the quick key and/or an expiration time for the quick key can be predetermined by an administrator or, in some embodiments, set by the requesting user.

Process 722 can include determining whether the option to generate the quick key was requested while a VC facility was selected from the list of VC facilities available to the user. If so, process 724 associates the quick key with the selected VC facility. If not, then process 726 can optionally create a VC facility and associate the quick key with the newly created VC facility automatically. Process 726 can also include prompting the user to select a type of VC facility to create for the quick key.

Room list pop-up window 212 and the quick key feature provided by tray application 102 provide a highly responsive and easy-to-use technique for accessing many types of virtual collaboration facilities without sacrificing security. For example, when presenters and participants have already joined a room or event, they may decide to spontaneously invite a user who is not authenticated to join them. The new user can be given a quick key to gain access to the virtual collaboration facility on the spur of a moment, thus using the time available most efficiently. Further, authenticated users can quickly and easily access virtual collaboration facilities on their list without re-arranging other windows on their desktop displays.

The logic instructions, processing systems, and circuitry described herein may be implemented using any suitable combination of hardware, software, and/or firmware logic instructions, such as general purpose computer systems, workstations, servers, Field Programmable Gate Arrays (FPGAs), Application Specific Integrated Circuit (ASICs), magnetic storage media, optical storage media, and other suitable computer-related devices. The logic instructions can be independently implemented or included in one of the other system components. Similarly, other components are disclosed herein as separate and discrete components. These components may, however, be combined to form larger or different software modules, logic modules, integrated circuits, or electrical assemblies, if desired.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

In the claims, unless otherwise indicated the article "a" is to refer to "one or more than one".

We claim:

1. A computer product comprising: computer-executable logic instructions stored on a tangible computer readable medium and operable to:
    generate a selectable option for displaying a list of virtual collaboration facilities associated with a user;
    detect selection of the option;
    generate a list of virtual collaboration facilities associated with the user when the option is selected;
    detect selection of one of the virtual collaboration facilities on the list;
    request information associated with one of the virtual collaboration facilities when the one of the virtual collaboration facilities is selected; and
    detect input from the user as a request for a quick key, wherein the quick key can be used to allow an unauthenticated user to enter at least one virtual collaboration facility.

2. The computer product of claim 1 wherein the option for displaying a list of facilities is represented by an icon that is accessible from a tray area without moving or adjusting other display elements on a user interface display.

3. The computer product of claim 1, wherein at least one of the group consisting of: complexity of the quick key and expiration time of the quick key, can be predetermined by an administrator.

4. The computer product of claim 1 further comprising: computer-executable logic instructions operable to:
present options to create different types of quick keys, wherein the different types of quick keys determine whether various capabilities available to users of a virtual collaboration facility are enabled or disabled.

5. The computer product of claim 1 further comprising: computer-executable logic instructions operable to:
automatically copy the quick key to a clipboard area from which the quick key can be pasted into an electronic communication to the unauthenticated user.

6. The computer product of claim 1 further comprising: computer-executable logic instructions operable to:
automatically combine and format the quick key and a network address for the virtual collaboration facility for use in a browser program.

7. The computer product of claim 1 wherein the list of virtual collaboration facilities is displayed in a pop-up window.

8. The computer product of claim 7 wherein the pop-up window includes selectable options to allow the user to manage at least one of the group consisting of: the virtual collaboration facilities, and the user's profile.

9. The computer product of claim 7 wherein the pop-up window includes a data entry field wherein the user can provide a security token to gain access to the selected virtual collaboration facility.

10. The computer product of claim 1 further comprising: a processing device operable to execute the logic instructions.

11. A computer-implemented method comprising:
generating a selectable option for displaying a list of virtual collaboration facilities associated with a user;
requesting information associated with one of the virtual collaboration facilities when the one of the virtual collaboration rooms is selected;
detecting input from an authenticated user as a request for a quick key via a virtual collaboration facility, wherein the quick key can be provided to an unauthenticated user to allow the unauthenticated user to gain access to the virtual collaboration facility; and
generating the list of virtual collaboration facilities in a pop-up window, wherein the pop-up window includes selectable options to allow the user to manage at least one of the group consisting of: the virtual collaboration facilities, and the user's profile.

12. The method of claim 11 wherein the option for displaying the list of virtual collaboration facilities associated with the user is represented by an icon that is located in an area of a user interface display that can be accessed without disturbing the rest of the user interface display.

13. The method of claim 11, wherein at least one of the group consisting of: complexity of the quick key and expiration time of the quick key, can be configured by an administrator.

14. The method of claim 11 further comprising:
presenting options to create different types of quick keys, wherein the different types of quick keys determine whether various capabilities available to users of the selected one of the virtual collaboration facilities are enabled or disabled.

15. The method of claim 11 further comprising:
combining the quick key and a network address for the selected virtual collaboration facility to generate a combined network address and quick key for use in a browser program; and
copying the combined network address and quick key to a clipboard area from which the combined network address and quick key can be pasted into an electronic communication to the unauthenticated user.

16. A computer implemented method comprising:
generating a list of virtual collaboration facilities associated with a user when an option for displaying a list of virtual collaboration facilities is selected from a user interface;
providing information associated with one of the virtual collaboration facilities when the one of the virtual collaboration facilities is selected from the list; and
generating a quick key upon request from the user, wherein the quick key allows an unauthenticated user to access the selected one of the virtual collaboration facilities.

17. The computer implemented method of claim 16, wherein at least one of the group consisting of: complexity of the quick key and expiration time of the quick key, is predetermined by an administrator.

18. The computer implemented method of claim 16, further comprising:
determining whether various capabilities are available to another user of a virtual collaboration facility based on the type of quick key entered by the other user.

19. The computer implemented method of claim 16 further comprising:
receiving input from the user to manage the virtual collaboration facilities on the list, and/or the user's profile.

20. A computer product comprising:
computer-executable logic instructions stored on a tangible computer readable medium and operable to:
receive a request from an authenticated user for a quick key via a user interface for accessing virtual collaboration facilities, wherein the quick key allows an unauthenticated user to access at least one of the virtual collaboration facilities; and
determine whether the quick key was requested while a virtual collaboration facility was selected from a list of virtual collaboration facilities available to the authenticated user, and if so, associate the quick key with the selected virtual collaboration facility.

21. The computer product of claim 20, further comprising: computer-executable logic instructions operable to:
create a virtual collaboration facility if the quick key was not requested while a virtual collaboration facility was selected from a list of virtual collaboration facilities.

22. An apparatus comprising:
logic instructions stored on a tangible computer readable medium including:
browser means for displaying information from an information network and receiving input from a user;
means for displaying a list of virtual facilities associated with a user in a pop-up window in a browser display;
means for authenticating the user;
means for allowing the user to select one of the virtual facilities from the pop-up window; and
means for an authenticated user to generate a temporary key for one of the virtual facilities, wherein the key allows an unauthenticated user to access information for the one of the virtual facilities.

* * * * *